United States Patent
Kim et al.

(10) Patent No.: US 10,558,290 B2
(45) Date of Patent: Feb. 11, 2020

(54) ELECTRONIC DEVICE AND METHOD FOR RECOGNIZING TOUCH INPUT THEREFOR

(71) Applicant: Samsung Electronics Co., Ltd., Gyeonggi-do (KR)

(72) Inventors: Kiwon Kim, Gyeonggi-do (KR); Sungjun Lee, Gyeonggi-do (KR); Heesoo Son, Seoul (KR); Seungmin Chung, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/410,095

(22) Filed: Jan. 19, 2017

(65) Prior Publication Data
US 2017/0205944 A1    Jul. 20, 2017

(30) Foreign Application Priority Data
Jan. 19, 2016   (KR) .................. 10-2016-0006264

(51) Int. Cl.
*G06F 3/041*    (2006.01)
*G06K 9/00*    (2006.01)

(52) U.S. Cl.
CPC ......... *G06F 3/0416* (2013.01); *G06K 9/0002* (2013.01); *G06F 2203/04105* (2013.01); *G06F 2203/04106* (2013.01)

(58) Field of Classification Search
CPC .............. G06F 3/0416; G06F 3/03545; G06F 2203/04105; G06F 2203/04106; G06F 3/041; G06K 9/0002
See application file for complete search history.

(56) References Cited

U.S. PATENT DOCUMENTS

| 2008/0284748 | A1* | 11/2008 | Hsu | G06F 3/041 345/173 |
| 2011/0001708 | A1* | 1/2011 | Sleeman | G06F 3/0416 345/173 |
| 2014/0168142 | A1* | 6/2014 | Sasselli | G06F 3/0416 345/174 |
| 2014/0240261 | A1 | 8/2014 | Heo et al. | |
| 2015/0261378 | A1* | 9/2015 | Lee | G06F 3/0416 715/765 |
| 2016/0063296 | A1* | 3/2016 | Du | G06K 9/00067 382/124 |

FOREIGN PATENT DOCUMENTS

KR    1020140106097    9/2014

\* cited by examiner

*Primary Examiner* — Lunyi Lao
*Assistant Examiner* — Jarurat Suteerawongsa
(74) *Attorney, Agent, or Firm* — The Farrell Law Firm, P.C.

(57) ABSTRACT

An electronic device and method for recognizing a touch input on the electronic device is provided. The electronic device includes a touch panel and a processor. The processor configured to determine the type of an object contacting the touch panel, set, when the object is of a first type, a threshold for touch recognition on the touch panel to a first designated value, set, when the object is of a second type, the threshold to a second designated value, and recognize a touch input by the object on the basis of the threshold set to one of the first designated value and the second designated value.

16 Claims, 8 Drawing Sheets

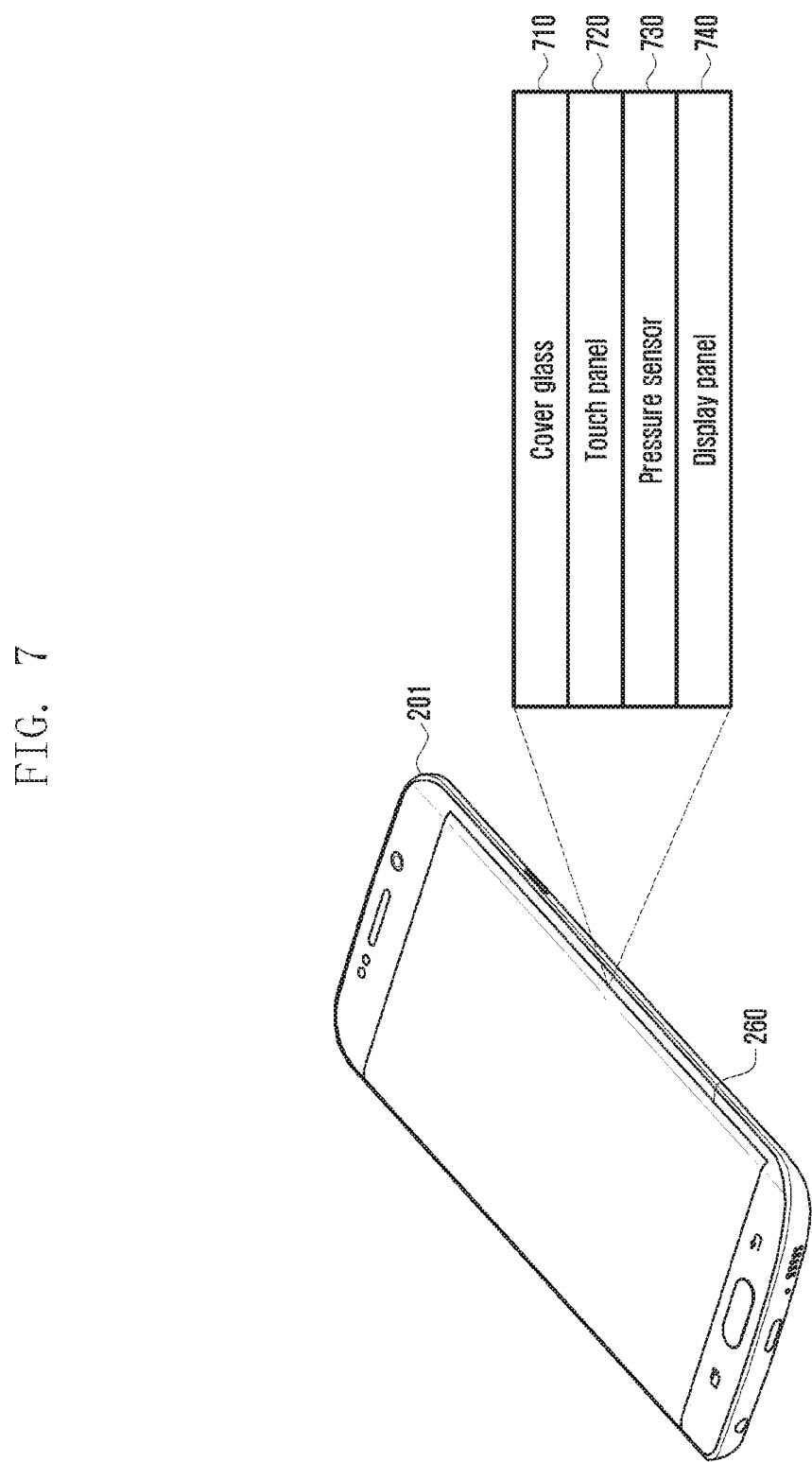

ELECTRONIC DEVICE AND METHOD FOR RECOGNIZING TOUCH INPUT THEREFOR

PRIORITY

This application claims priority under 35 U.S.C. § 119(a) to Korean Patent Application Serial No. 10-2016-0006264, which was filed on Jan. 19, 2016 in the Korean Intellectual Property Office, the entire disclosure of which is incorporated herein by reference.

BACKGROUND

1. Field of the Disclosure

The present disclosure generally relates to an electronic device and method thereof that recognizes a touch input by an object contacting a touch panel of the electronic device.

2. Description of the Related Art

Modern electronic devices such as TVs, smartphones, MP3 players, PMPs, laptop computers and PDAs are equipped with various input/output modules. Input/output modules enable users to control their electronic devices in an easy and convenient manner. There are size limitations of input/output modules that are installable in small electronic devices such as mobile phones, MP3 players, PMPs, laptop computers and PDAs. To enhance user interfaces of such small electronic devices, the use of touch panels, touch-screens, and navigation pads have been on the rise. In addition, the popularity of mobile terminals and tablet computers equipped with touchscreens has necessitated various types of user interfaces.

When processing a touch input on the touch panel of an electronic device, the touch recognition thresholds for a stylus pen and a finger contacting the touch panel may be set to diameter values of Ø2.5 mm and Ø6 mm, respectively, where the symbol Ø indicates diameter. In this case, as the touch recognition threshold for the stylus pen is greater than that for the finger, the touch panel may react sensitively to the contact of the finger, generating a touch event unintended by the user.

In addition, when the threshold for recognizing touch movement is set uniformly regardless of the type or area of a touch object, the electronic device may recognize movement of the touch object caused by an unintended user action such as a touch move event.

SUMMARY

Aspects of the present disclosure are to address at least the above mentioned problems and/or disadvantages and to provide at least the advantages described below. Accordingly, an aspect of the present disclosure is to provide an apparatus and method that determines the type of a touch object and adjusts the threshold for touch or touch movement recognition on the basis of the touch object type.

In accordance with an aspect of the present disclosure, an electronic device is provided. The electronic device includes a touch panel and a processor. The processor configured to determine the type of an object contacting the touch panel, set, when the object is of a first type, a threshold for touch recognition on the touch panel to a first designated value, set, when the object is of a second type, the threshold to a second designated value, and recognize a touch input by the object on the basis of the threshold set to one of the first designated value and the second designated value.

In accordance with another aspect of the present disclosure, a method for touch input recognition is provided. The method includes determining the type of an object contacting a touch panel, setting, when the object is of a first type, a threshold for touch recognition on the touch panel to a first designated value, setting, when the object is of a second type, the threshold to a second designated value, and recognizing touch input by the object on the basis of the threshold set to one of the first designated value and the second designated value.

In accordance with another aspect of the present disclosure, a non-transitory, computer-readable storage medium stores a program that, when executed by a processor, causes the processor to determine the type of an object contacting a touch panel, set, when the object is of a first type, a threshold for touch recognition on the touch panel to a first designated value, set, when the object is of a second type, the threshold to a second designated value, and recognize a touch input by the object on the basis of the threshold set to one of the first designated value and the second designated value.

BRIEF DESCRIPTION OF THE DRAWINGS

The above and other aspects, features, and advantages of the present disclosure will be more apparent from the following detailed description taken in conjunction with the accompanying drawings, in which:

FIG. 7 illustrates an electronic device whose display module includes pressure sensors according to an embodiment of the present disclosure.

DETAILED DESCRIPTION

Hereinafter, various embodiments of the present disclosure will be described in detail with reference to the accompanying drawings.

Figure 1:
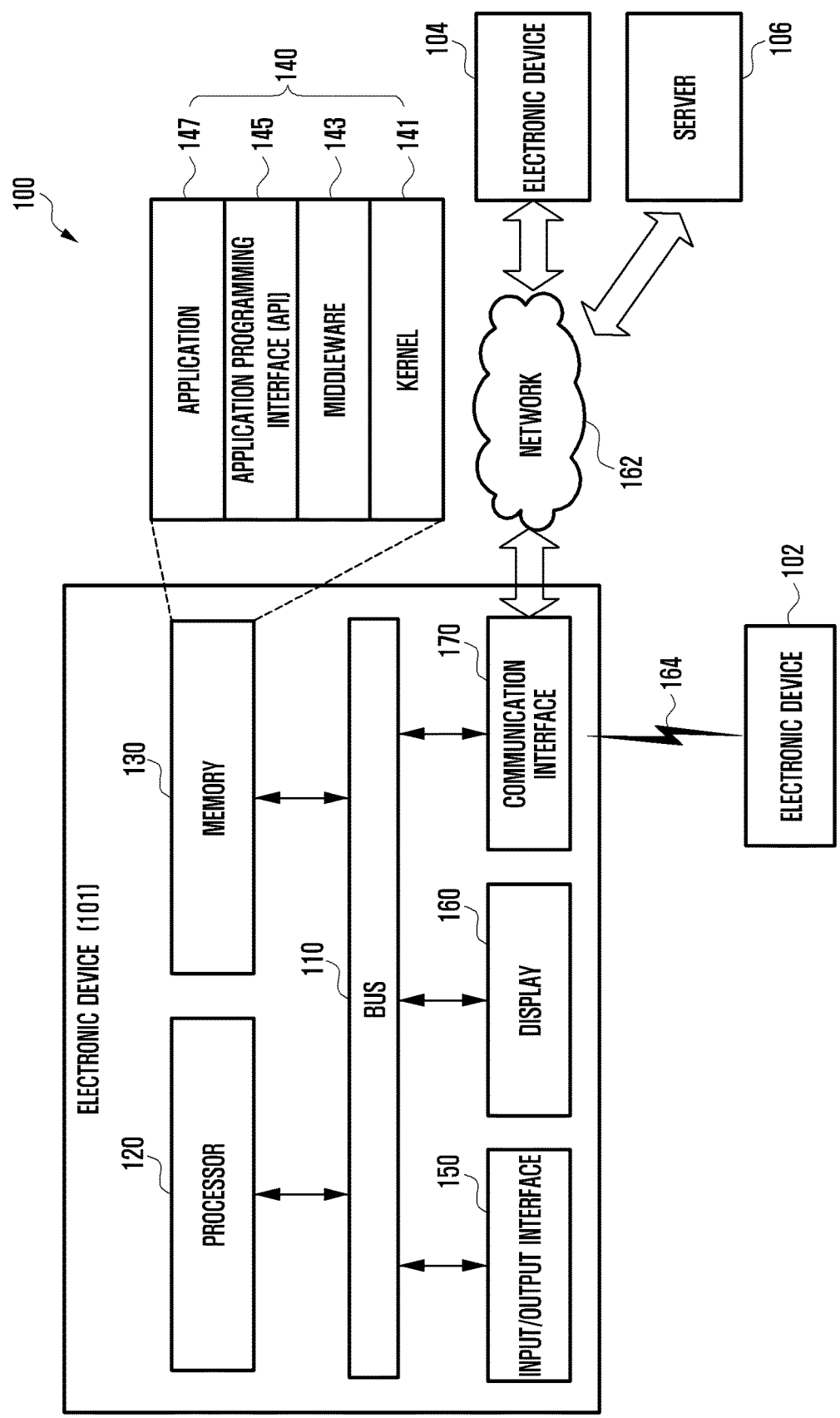
FIG. 1 illustrates a network environment including electronic devices according to an embodiment of the present disclosure.

FIG. 1 illustrates a network environment including electronic devices according to an embodiment of the present disclosure.

Referring to FIG. 1, the electronic device 101 includes, but is not limited to, a bus 110, a processor 120, a memory 130, an input/output interface 150, a display 160, and a communication interface 170. The bus 110 may be a circuit designed for connecting the above-described elements and communicating data (e.g., a control message) between such elements. The processor 120 may receive commands from the other elements (e.g., the memory 130, the input/output interface 150, the display 160, or the communication interface 170, etc.) through the bus 110, interpret the received commands, and perform the arithmetic or data processing based on the interpreted commands. The memory 130 may store therein commands or data received from or created at the processor 120 or other elements (e.g., the input/output interface 150, the display 160, or the communication interface 170, etc.). The memory 130 includes programming modules 140 such as a kernel 141, a middleware 143, an application programming interface (API) 145, and an application 147. Each of the programming modules may be composed of software, firmware, hardware, and any combination thereof.

The kernel 141, as illustrated in FIG. 1, may control or manage system resources (e.g., the bus 110, the processor 120, the memory 130, etc.) used to execute operations or functions implemented by other programming modules (e.g., the middleware 143, the API 145, and the application 147). Also, the kernel 141 may provide an interface capable of accessing and controlling or managing the individual elements of the electronic device 101 by using the middleware 143, the API 145, or the application 147.

The middleware 143 may serve to go between the API 145 or the application 147 and the kernel 141 in such a manner that the API 145 or the application 147 communicates with the kernel 141 and exchanges data therewith. Also, in relation to work requests received from one or more applications 147 and/or the middleware 143, for example, may perform load balancing of the work requests by using a method of assigning a priority, in which system resources (e.g., the bus 110, the processor 120, the memory 130, etc.) of the electronic device 101 may be used, to at least one of the one or more applications 147. The API 145 is an interface through which the application 147 is capable of controlling a function provided by the kernel 141 or the middleware 143, and may include, for example, at least one interface or function for file control, window control, image processing, character control, or the like. The input/output interface 150 may deliver commands or data, entered by a user through an input/output unit or device (e.g., a sensor, a keyboard, or a touch screen), to the processor 120, the memory 130, or the communication interface 170 via the bus 110.

The display module 160 may include, for example, a liquid crystal display (LCD), a light emitting diode (LED) display, an organic LED (OLED) display, a micro electro mechanical system (MEMS) display, or an electronic paper display. The display 160 may display various types of content (e.g., text, images, videos, icons, or symbols) for users. The display module 160 may include a touch screen, and may receive, for example, a touch, gesture, proximity, or hovering input by using an electronic device or a part of the user's body.

The communication interface 170 may establish communication between the electronic device 101 and the first external electronic device 102, the second external electronic device 104, or the server 106. For example, the communication interface 170 may be connected with a network 162 through wired or wireless communication 164 and thereby communicate with the second external electronic device 104, or the server 106.

Wireless communication may use, as cellular communication protocol, at least one of long-term evolution (LTE), LTE advanced (LTE-A), code division multiple access (CDMA), wideband CDMA (WCDMA), universal mobile telecommunications system (UMTS), wireless broadband (WiBro), global system for mobile communications (GSM), and the like, for example. A short-range communication may include, for example, at least one of Wi-Fi, Bluetooth (BT), near field communication (NFC), magnetic secure transmission or near field magnetic data stripe transmission (MST), and GNSS, and the like. The GNSS may include at least one of, for example, a global positioning system (GPS), a global navigation satellite system (GLONASS), a BeiDou navigation satellite system (BeiDou), and Galileo (European global satellite-based navigation system). Hereinafter, the term "GPS" may be interchangeably used with the term "GNSS" in the present disclosure.

The wired communication may include, but is not limited to, at least one of universal serial bus (USB), high definition multimedia interface (HDMI), recommended standard 232 (RS-232), or plain old telephone service (POTS). The network 162 includes, as a telecommunications network at least one of a computer network (e.g., local area network (LAN) or wide area network (WAN)), the internet, and a telephone network. The types of the first and second external electronic devices 102 and 104 may be the same as or different from the type of the electronic device 101. The server 106 may include a group of one or more servers. A portion or all of operations performed in the electronic device 101 may be performed in one or more other electronic devices 102 or 104 or the server 106. In the case where the electronic device 101 performs a certain function or service automatically or in response to a request, the electronic device 101 may request at least a portion of functions related to the function or service from another electronic device 102 or 104 or the server 106 instead of, or in addition to, performing the function or service for itself. The other electronic device 102 or 104 or the server 106 may perform the requested function or additional function, and may transfer a result of the performance to the electronic device 101. The electronic device 101 may additionally process the received result to provide the requested function or service. To this end, for example, a cloud computing technology, a distributed computing technology, or a client-server computing technology may be used.

Figure 2:
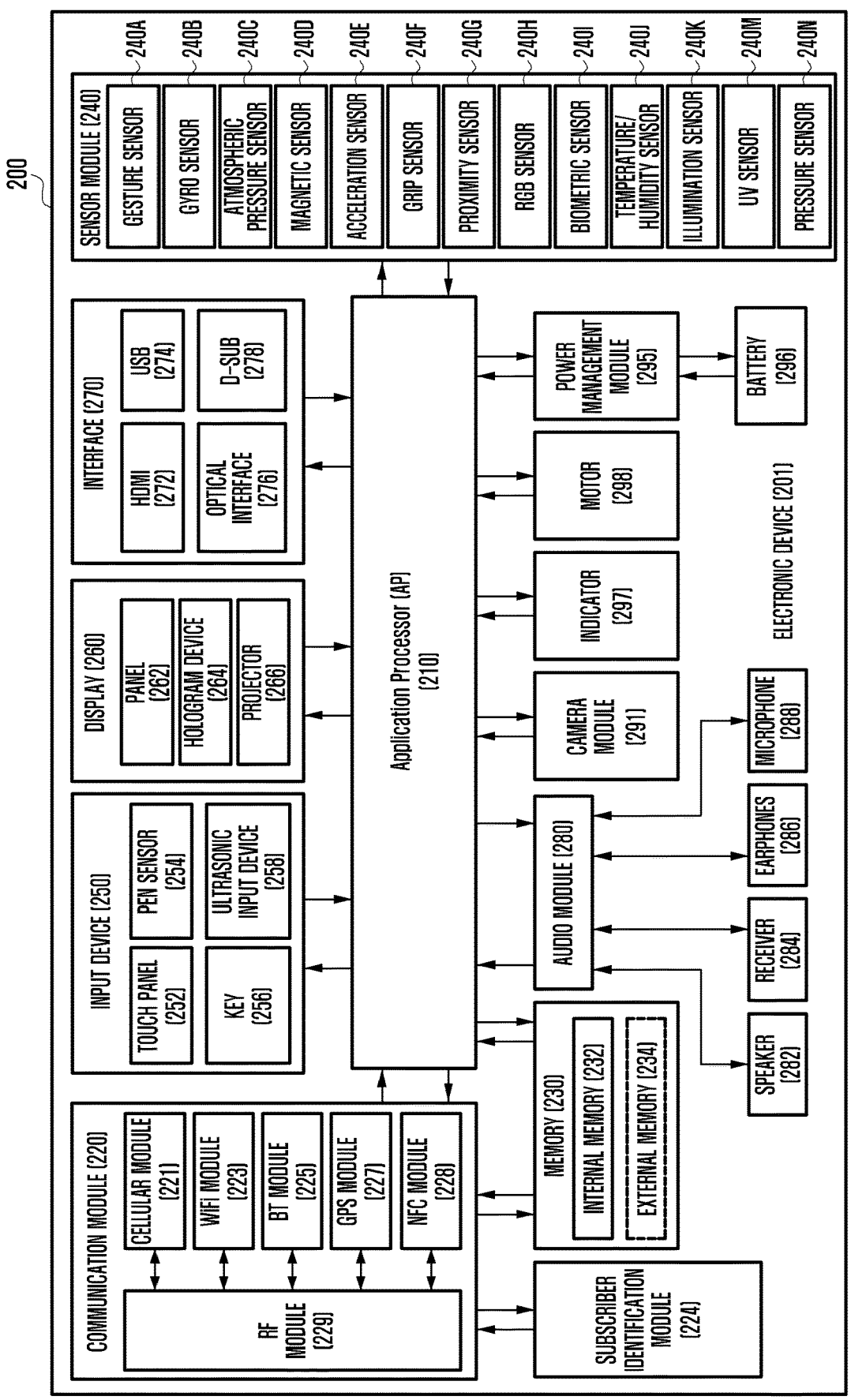
FIG. 2 is a block diagram of an electronic device according to an embodiment of the present disclosure.

FIG. 2 is a block diagram illustrating an electronic device according to an embodiment of the present disclosure.

The electronic device 201 may form, for example, the whole or part of the electronic device 101 shown in FIG. 1.

Referring to FIG. 2, the electronic device 201 includes at least one AP 210, a communication module 220, a subscriber identification module (SIM) card 224, a memory 230, a sensor module 240, an input unit or input device 250, a display or display module 260, an interface 270, an audio module 280, a camera module 291, a power management module 295, a battery 296, an indicator 297, and a motor 298. The processor 210 is capable of driving, for example, an operating system or an application program to control a plurality of hardware or software components connected to the processor 210, processing various data, and performing operations. The processor 210 may be implemented as, for example, a system on chip (SoC). According to an embodiment of the present disclosure, the processor 210 may further include a graphics processing unit (GPU) and/or an image signal processor.

The processor 210 may also include at least part of the components shown in FIG. 2, e.g., a cellular module 221. The processor 210 is capable of loading commands or data received from at least one of other components (e.g., a non-volatile memory) on a volatile memory, processing the loaded commands or data. The processor 210 is capable of storing various data in a non-volatile memory. The communication module 220 (e.g., the communication interface 170) may perform a data communication with the electronic device 104 or the server 106 connected to the electronic device 201 (e.g., the electronic device 101) through the network. According to an embodiment of the present disclosure, the communication module 220 may include therein a cellular module 221, a Wi-Fi module 223, a BT module 225, a GNSS or GPS module 227, an NFC module 228, and a radio frequency (RF) module 229. The cellular module 221 is capable of providing a voice call, a video call, a short message service (SMS), an Internet service, etc., through a communication network, for example. The cellular module 221 is capable of identifying and authenticating an electronic device 201 in a communication network by using a SIM 224 (e.g., a SIM card). The cellular module 221 is capable of performing at least part of the functions provided by the processor 210. The cellular module 221 is also capable of including a communication processor (CP).

As illustrated in FIG. 2, the Wi-Fi module 223, the BT module 225, the GNSS module 227, and the NFC module 228 are each capable of including a processor for processing data transmitted or received through the corresponding module.

The MST module 228 may include a processor for processing data transmitted or received through the corresponding module. According to an embodiment of the present disclosure, at least part of the cellular module 221, Wi-Fi module 223, BT module 225, GNSS module 227, NFC module 228, and MST module (e.g., two or more modules) may be included in one integrated chip (IC) or one IC package. The RF module 229 is capable of transmission/reception of communication signals, e.g., RF signals. The RF module 229 may include a transceiver, a power amp module (PAM), a frequency filter, a low noise amplifier (LNA), an antenna, etc. At least one of the cellular module 221, the Wi-Fi module 223, the BT module 225, the GNSS module 227, and the NFC module 228 is capable of transmission/reception of RF signals through a separate RF module. The SIM may include a card including a SIM and/or an embodied SIM. The SIM module 224 is also capable of containing unique identification information, e.g., integrated circuit card identifier (ICCID), or subscriber information, e.g., international mobile subscriber identity (IMSI).

As illustrated in FIG. 2, memory 230 (e.g., memory 103 shown in FIG. 1) includes built-in or internal memory 232 and/or an external memory 234. The built-in or internal memory 232 may include at least one of the following: a volatile memory, e.g., a dynamic random access memory (DRAM), a static RAM (SRAM), a synchronous dynamic RAM (SDRAM), etc., and a non-volatile memory, e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., an NAND flash memory, an NOR flash memory, etc.), a hard drive, a solid state drive (SSD), etc.

The sensor module 240 is capable of measuring/detecting a physical quantity or an operation state of the electronic device 201, and converting the measured or detected information into an electronic signal. The sensor module 240 includes a gesture sensor 240A, a gyro sensor 240B, an atmospheric pressure or barometer sensor 240C, a magnetic sensor 240D, an acceleration sensor 240E, a grip sensor 240F, a proximity sensor 240G, a color or RGB sensor 240H (e.g., a red, green and blue (RGB) sensor), a biometric sensor 240I, a temperature/humidity sensor 240J, an illuminance sensor 240K, and an ultraviolet (UV) sensor 240M.

Additionally or alternatively, the sensor module 240 may include one or more of an electronic nose (E-nose) sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 may include a control circuit for controlling one or more sensors included therein.

In an embodiment of the present disclosure, the electronic device 201 may include a processor, configured as part of the processor 210 or a separate component, for controlling the sensor module 240. In this case, while the processor 210 is operating in a sleep mode, the processor is capable of controlling the sensor module 240. The input device 250 includes a touch panel 252, a (digital) pen sensor (digital pen or stylus) 254, a key 256, or an ultrasonic input unit or device 258. The touch panel 252 may be implemented with at least one of the following: a capacitive touch system, a resistive touch system, an infrared touch system, and an ultrasonic touch system. The touch panel 252 may further include a control circuit. The touch panel 252 may also further include a tactile layer to provide a tactile response to the user. The (digital) pen sensor 254 may be implemented with a part of the touch panel or with a separate recognition sheet. The key 256 may include a physical button, an optical key, or a keypad. The ultrasonic input unit 258 is capable of detecting ultrasonic waves, created in an input tool, through a microphone 288, and identifying data corresponding to the detected ultrasonic waves.

The display 260 (e.g., the display 106 shown in FIG. 1) includes a panel 262, a hologram unit or device 264, or a projector 266. The panel 262 may include the same or similar configurations as the display 106 shown in FIG. 1. The panel 262 may be flexible, transparent, or wearable.

The panel 262 may also be incorporated into one module together with the touch panel 252. The hologram unit 264 is capable of showing a stereoscopic image in the air by using light interference. The projector 266 is capable of displaying an image by projecting light onto a screen. The screen may be located inside or outside of the electronic device 201. According to an embodiment of the present disclosure, the display 260 may further include a control circuit for controlling the panel 262, the hologram unit 264, or the projector 266.

The interface 270 includes an HDMI 272, a USB 274, an optical interface 276, or a D-subminiature (D-sub) 278. The interface 270 may be included in the communication interface 107 shown in FIG. 1. Additionally or alternatively, the interface 270 may include a mobile high-definition link (MHL) interface, an SD card/MMC interface, or an infrared data association (IrDA) standard interface.

The audio module 280, as illustrated in FIG. 2, is capable of providing bidirectional conversion between a sound and an electronic signal. At least part of the components in the audio module 280 may be included in the input/output interface 150 shown in FIG. 1. The audio module 280 is also capable of processing sound information input or output through a speaker 282, a receiver 284, earphones 286, microphone 288, etc.

The camera module 291 refers to a device capable of taking both still and moving images. According to an embodiment of the present disclosure, the camera module 291 may include one or more image sensors (e.g., a front image sensor or a rear image sensor), a lens, an image signal processor (ISP), a flash (e.g., an LED or xenon lamp), etc.

The power management module 295 is capable of managing power of the electronic device 201. According to an embodiment of the present disclosure, the power management module 295 may include a power management IC (PMIC), a charger IC, or a battery gauge. The PMIC may employ wired charging and/or wireless charging methods. Examples of the wireless charging method are magnetic resonance charging, magnetic induction charging, and electromagnetic charging. The PIMC may further include an additional circuit for wireless charging, such as a coil loop, a resonance circuit, a rectifier, etc. The battery gauge is capable of measuring the residual charge capacity, charge in voltage, current, or temperature of the battery 296. The battery 296 takes the form of either a rechargeable battery or a solar battery.

The indicator 297 is capable of displaying a specific status of the electronic device 201 or a part thereof (e.g., the processor 210), e.g., a boot-up status, a message status, a charging status, etc. The motor 298 is capable of converting an electrical signal into mechanical vibrations, such as, a vibration effect, a haptic effect, etc. The electronic device 201 may include a processing unit (e.g., GPU) for supporting a mobile TV. The processing unit for supporting a mobile TV is capable of processing media data pursuant to standards, e.g., digital multimedia broadcasting (DMB), digital video broadcasting (DVB), or MediaFLO™, etc.

Each of the elements described in the present disclosure may be formed with one or more components, and the names of the corresponding elements may vary according to the type of the electronic device. The electronic device may include at least one of the above described elements described in the present disclosure, and may exclude some of the elements or further include other additional elements. Further, some of the elements of the electronic device according to an embodiment of the present disclosure may be coupled to form a single entity while performing the same functions as those of the corresponding elements before the coupling.

Figure 3:
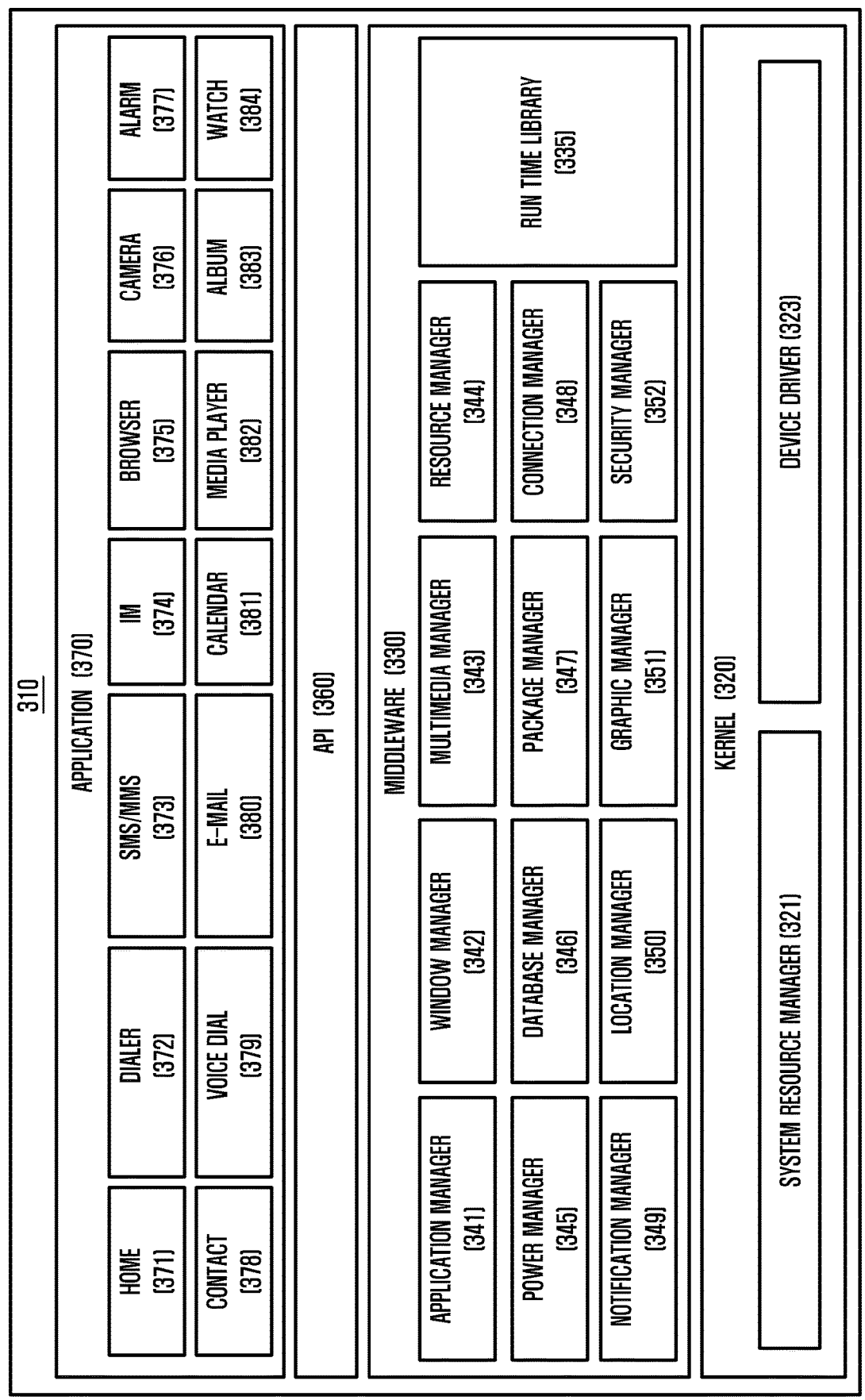
FIG. 3 is a block diagram of a program module according to an embodiment of the present disclosure.

FIG. 3 is a block diagram illustrating a configuration of a programming module according to an embodiment of the present disclosure.

The programming module 310 may be included (or stored) in the electronic device 100 (e.g., the memory 130) illustrated in FIG. 1, or may be included (or stored) in the electronic device 201 (e.g., the memory 230) illustrated in FIG. 2. At least a part of the programming module 310 may be implemented in software, firmware, hardware, or a combination of two or more thereof. The programming module 310 may be implemented in hardware (e.g., the hardware 200 of FIG. 2), and may include an operating system (OS) controlling resources related to an electronic device (e.g., the electronic device 100) and/or various applications (e.g., an application 370) executed in the OS. For example, the OS may be Android™, iOS™, Windows™, Symbian™, Tizen™, Bada™, and the like.

Referring to FIG. 3, the programming module 310 includes a kernel 320, a middleware 330, an API 360, and/or the application 370.

The kernel 320 (e.g., the kernel 141 in FIG. 1) includes a system resource manager 321 and/or a device driver 323. The system resource manager 321 may include, for example, a process manager, a memory manager, and a file system manager. The system resource manager 321 may perform the control, allocation, recovery, and the like of system resources. The device driver 323 may include, for example, a display driver, a camera driver, a BT driver, a shared memory driver, a USB driver, a keypad driver, a Wi-Fi driver, and/or an audio driver. Also, according to an embodiment of the present disclosure, the device driver 312 may include an inter-process communication (IPC) driver.

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 132) includes at least one of a runtime library 335, an application manager 341, a window manager 342, a multimedia manager 343, a resource manager 344, a power manager 345, a database manager 346, a package manager 347, a connectivity or connection manager 348, a notification manager 349, a location manager 350, a graphic manager 351, a security manager 352, and any other suitable and/or similar manager(s).

The runtime library 335 may include, for example, a library module used by a compiler, in order to add a new function by using a programming language during the execution of the application(s) 370. According to an embodiment of the present disclosure, the runtime library 335 may perform functions which are related to input and output, the management of a memory, an arithmetic function, and the like.

The application manager 341 may manage, for example, a life cycle of at least one of the applications 370. The window manager 342 may manage graphical user interface (GUI) resources used on the screen. The multimedia manager 343 may detect a format used to reproduce various media files and may encode or decode a media file through a codec appropriate for the relevant format. The resource manager 344 may manage resources, such as a source code, a memory, a storage space, and the like of at least one of the applications 370.

The power manager 345, as illustrated in FIG. 3, may operate together with a basic input/output system (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity or connection manager 348 may manage a wireless connectivity such as, for example, Wi-Fi and BT. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 100) has a telephone function, the middleware 330 may further include a telephony manager for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in an embodiment of the present disclosure, may further include other elements, or may replace some of the elements with elements, each of which performs a similar function and has a different name.

The API 360 (e.g., the API 133) is a set of API programming functions, and may be provided with a different configuration according to an OS. In the case of Android™ or iOS™, for example, one API set may be provided to each platform. In the case of Tizen™, for example, two or more API sets may be provided to each platform.

The applications 370 (e.g., the applications 134) may include, for example, a preloaded application and/or a third party application. The applications 370 (e.g., the applications 134) include, for example, a home application 371, a dialer application 372, a short message service (SMS)/multimedia message service (MMS) application 373, an instant message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application(s).

At least a part of the programming module 310 may be implemented by instructions stored in a non-transitory computer-readable storage medium. When the instructions are executed by one or more processors (e.g., the one or more processors 210), the one or more processors may perform functions corresponding to the instructions. The non-transitory computer-readable storage medium may be, for example, the memory 220. At least a part of the programming module 310 may be implemented (e.g., executed) by, for example, the one or more processors 210. At least a part of the programming module 310 may include, for example, a module, a program, a routine, a set of instructions, and/or a process for performing one or more functions.

Figure 4:
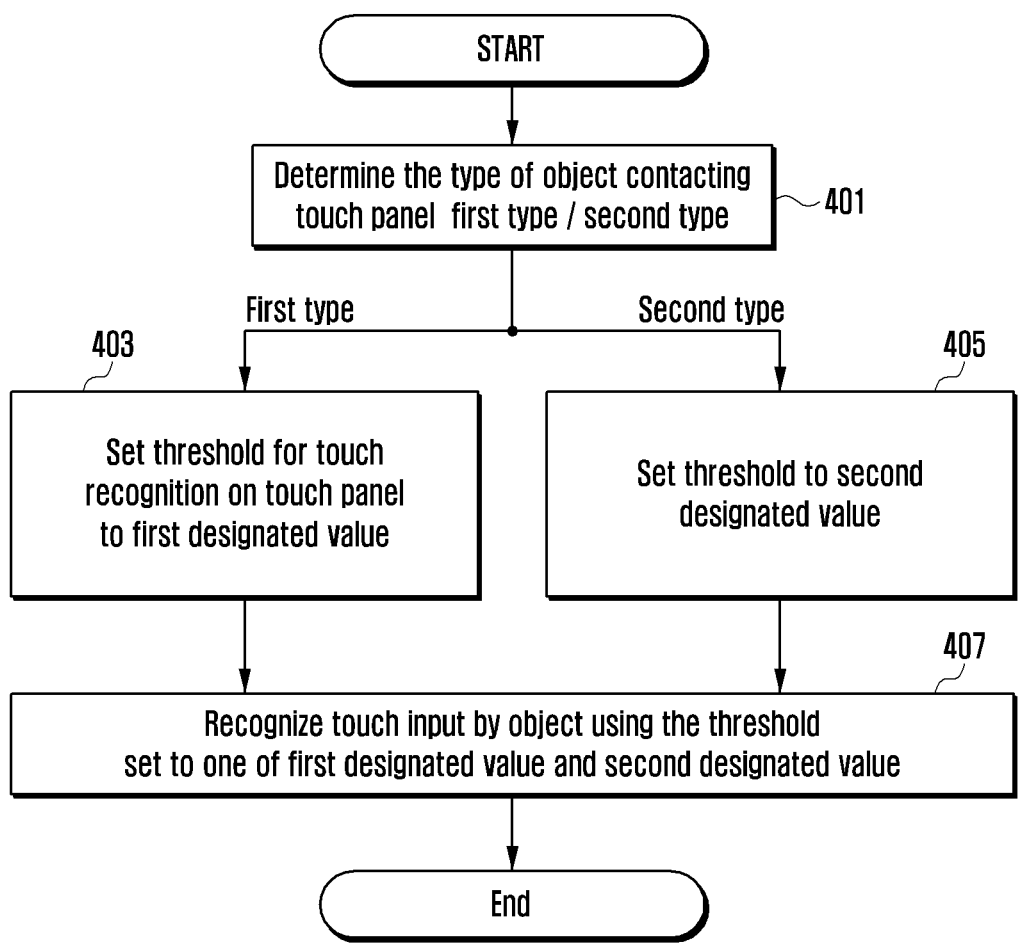
FIG. 4 is a flowchart of a procedure for an electronic device to recognize touch input caused by an object according to an embodiment of the present disclosure.

FIG. 4 is a flowchart of a procedure for the electronic device 201 to recognize touch input caused by an object according to an embodiment of the present disclosure.

At step 401, the electronic device 201 (e.g. processor 210) determines the type of a touch object contacting the touch panel 252. The touch object may be an object having a narrow touch area in contact with the touch panel 252 or may be an object having a wide touch area in contact with the touch panel 252. For example, the object having a narrow touch area may be a stylus pen, electronic pen, digital pen, or touch pen, and the object having a wide touch area may be a finger of the user.

Figure 5A:
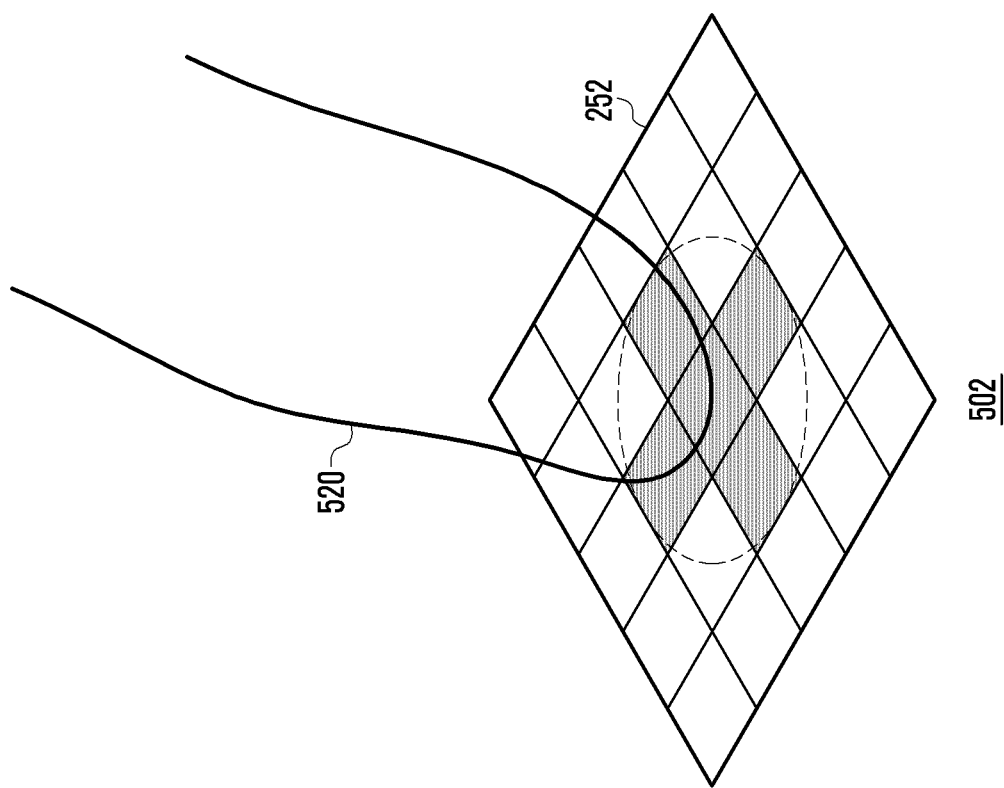
FIG. 5A illustrates determining the type of an object contacting a touch panel on the basis of the touch area of the object according to an embodiment of the present disclosure.
Figure 5A:
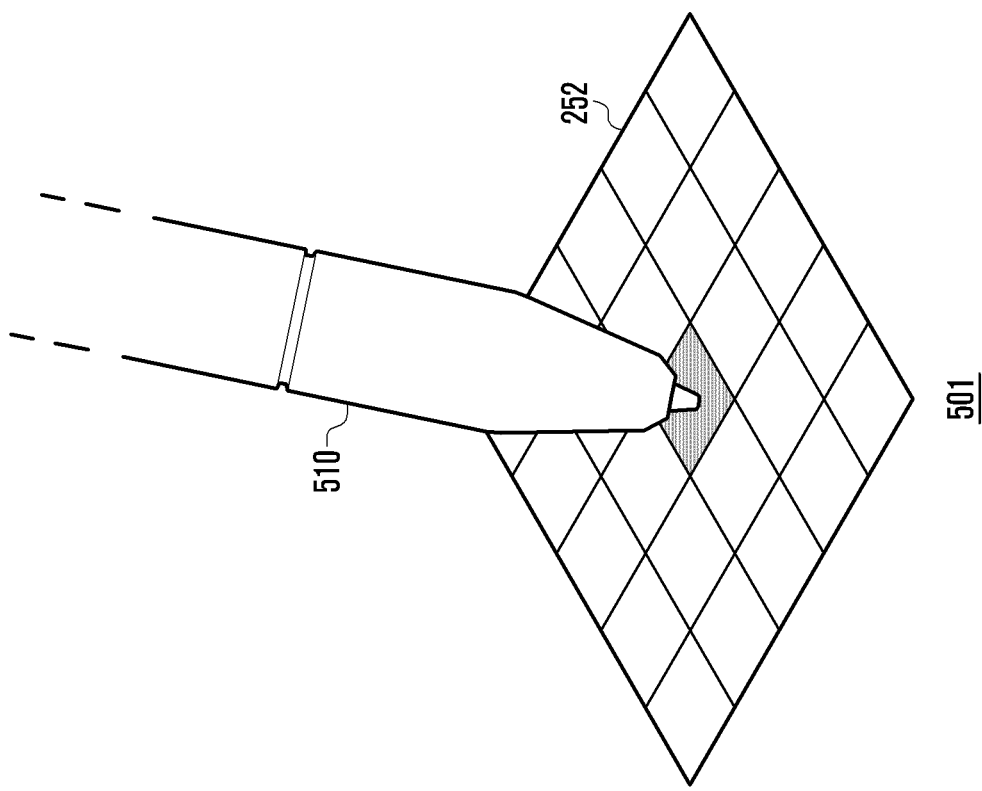

In an embodiment of the present disclosure, the electronic device 201 may determine the type of the object contacting the touch panel 252 on the basis of the touch area of the object. The electronic device 201 may identify the touch area of the object by counting the number of touch cells of the touch panel 252 whose capacitance is changed due to contact with the object. When the touch area is less than a preset threshold area, the electronic device 201 may determine that the object is of the first type. For example, assume that the threshold area is 3 touch cells. As indicated by reference numeral 501 in FIG. 5A, the electronic device 201 may identify the touch area of an object 510 by counting the number of touch cells whose capacitance is changed due to contact with the object 510 (e.g. 1 touch cell). As the touch area of the object 510 includes 1 touch cell which is less than the threshold area of 3 touch cells, the electronic device 201 may determine that the object 510 is of the first type (e.g. stylus pen). When the touch area of the object is greater than or equal to the preset threshold area, the electronic device 201 may determine that the object is of the second type. For example, assume that the threshold area is 3 touch cells. As indicated by reference numeral 502 in FIG. 5A, the electronic device 201 may identify the touch area of an object 520 by counting the number of touch cells whose capacitance is changed due to contact with the object 520 (e.g. 4 touch cells). As the touch area of the object 520 includes 4 touch cells which is greater than the threshold area of 3 touch cells, the electronic device 201 may determine that the object 520 is of the second type (e.g. finger or thumb).

Figure 5B:
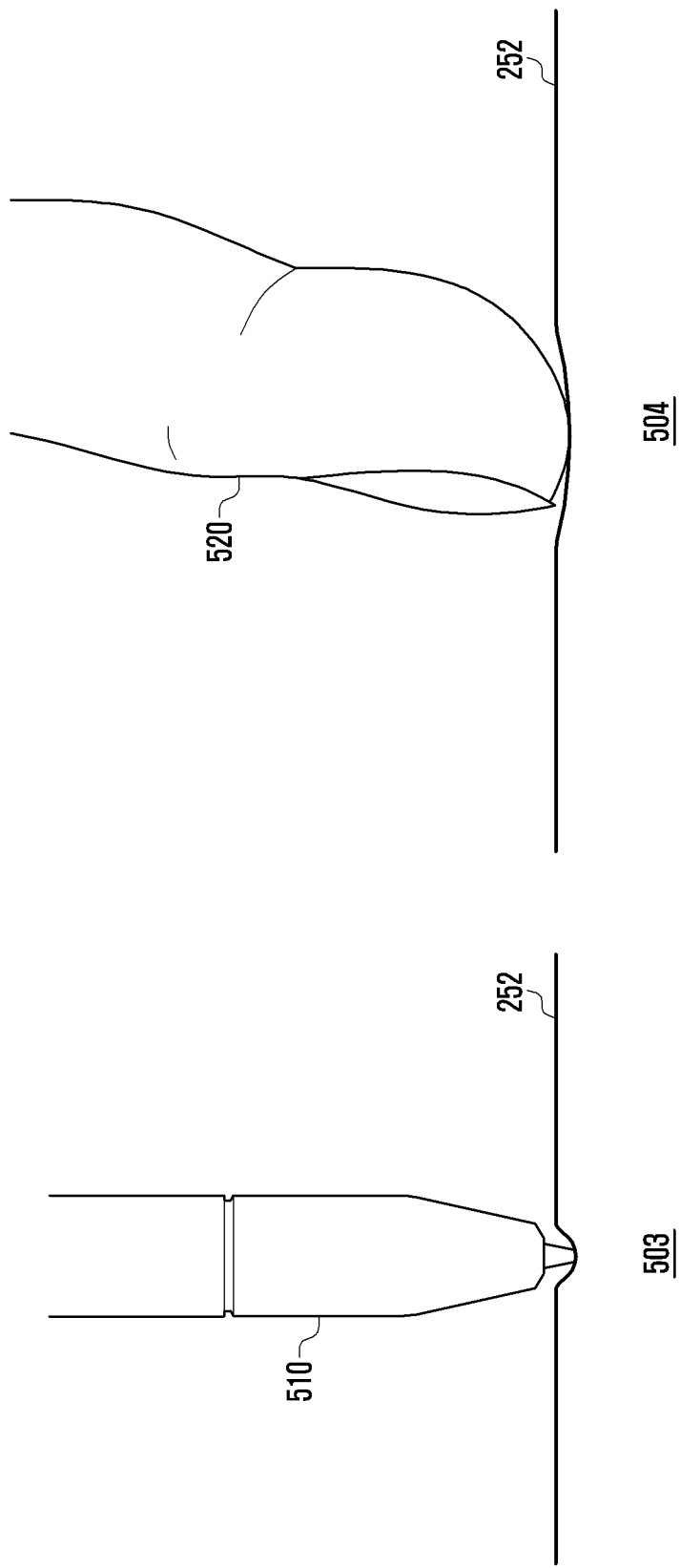
FIG. 5B illustrates determining the type of an object contacting the touch panel on the basis of the touch pressure applied by the object according to an embodiment of the present disclosure.

In an embodiment of the present disclosure, the electronic device 201 may determine the type of an object contacting the touch panel 252 on the basis of the touch pressure applied by the object. When a stylus pen and a finger are brought into contact with the touch panel 252 using the same force, as the pressure is inversely proportional to the area, the pressure applied to the touch panel 252 by the stylus pen may be greater than the pressure applied to the touch panel 252 by the finger. The electronic device 201 may measure the pressure applied by an object using one or more pressure sensors 240n. When the touch pressure applied by the object is greater than or equal to a preset threshold pressure, the electronic device 201 may determine that the object is of the first type. For example, assuming that the threshold pressure is 4. As indicated by reference numeral 503 in FIG. 5B, the electronic device 201 may identify the pressure applied to the touch panel 252 by an object 510 brought into contact with the touch panel 252 by using a pressure sensor 240n. When the touch pressure due to the object 510 (e.g. 6 units of pressure) is greater than or equal to the threshold pressure (4 units of pressure), the electronic device 201 may determine that the object 510 is of the first type (e.g. stylus pen). When the touch pressure applied by the object is lower than the preset threshold pressure, the electronic device 201 may determine that the object is of the second type. For example, assuming that the threshold pressure is 4 units of pressure. As indicated by reference numeral 504 in FIG. 5B, the electronic device 201 may identify the pressure applied to the touch panel 252 by an object 520 brought into contact with the touch panel 252 by using a pressure sensor 240n. When the touch pressure due to the object 520 (e.g. 2 units of pressure) is lower than the threshold pressure (4 units of pressure), the electronic device 201 may determine that the object 520 is of the second type (e.g. finger). The threshold area or the threshold pressure may be set by the user or set by the manufacturer at the time of manufacture.

In an embodiment of the present disclosure, the electronic device 201 may determine the type of an object contacting the touch panel 252 on the basis of precedence between the touch area and the touch pressure of the object. For example, assume that the touch area takes precedence over the touch pressure in determining the object type. When the touch area of an object (finger) is greater than or equal to the threshold area and the touch pressure due to the object (finger) is greater than or equal to the threshold pressure, the electronic device 201 may determine that the object is of the second type according to the higher precedence of the threshold area. As another example, assume that the touch pressure takes precedence over the touch area in determining the object type. When the touch area of an object (stylus pen) is greater than or equal to the threshold area and the touch pressure due to the object (stylus pen) is greater than or equal to the threshold pressure, the electronic device 201 may determine that the object is of the first type according to the higher precedence of the threshold pressure.

In an embodiment of the present disclosure, the touch panel 252 of the electronic device 201 may include a fingerprint recognition sensor, and the electronic device 201 may obtain a fingerprint related to touch action using the fingerprint recognition sensor. The electronic device 201 may pre-store fingerprints (or thumbprints) of the user and determine whether an obtained fingerprint matches one of the pre-stored fingerprints. The electronic device 201 may determine the type of an object at least partially on the basis of an obtained fingerprint. For example, the electronic device 201 may obtain a fingerprint from an object contacting the touch panel 252, and determine that the object is of the second type (e.g. finger) when the obtained fingerprint matches one of the pre-stored fingerprints. When acquisition of a fingerprint from an object contacting the touch panel 252 has failed or a fingerprint obtained from the object does not match the pre-stored fingerprints, the electronic device 201 may determine that the object is of the first type (e.g. stylus pen). When acquisition of a fingerprint from an object contacting the touch panel 252 is successful, the electronic device 201 may determine that the object is of the second type (e.g. finger) regardless of whether the obtained fingerprint matches the pre-stored fingerprints.

If the object is of the first type, at step 403, the electronic device 201 (e.g. processor 210) sets the threshold for touch recognition on the touch panel 252 (touch recognition threshold) to a first designated value. For example, if the object is of the first type (e.g. stylus pen), the electronic device 201 may set the touch recognition threshold to a value of Ø2.5 mm to sense contact of the stylus pen. This threshold may indicate the amount of change in capacitance for touch recognition.

In an embodiment of the present disclosure, when the object is of the first type, the electronic device 201 may set the touch recognition threshold to one of multiple first designated values according to at least one of the touch area and the touch pressure. For example, when the touch area of a first-type object is between 1 and 2 touch cells, the electronic device 201 may set the touch recognition threshold to a value of Ø2 mm. When the touch area of a first-type object is between 3 and 4 touch cells, the electronic device 201 may set the touch recognition threshold to a value of Ø3 mm. As another example, when the touch pressure caused by a first-type object is between 5 and 6 units of pressure, the electronic device 201 may set the touch recognition threshold to a value of Ø2 mm. When the touch pressure caused by a first-type object is between 7 and 8 units of pressure, the electronic device 201 may set the touch recognition threshold to a value of Ø3 mm.

If the object is of the second type, at step 405, the electronic device 201 (e.g. processor 210) sets the threshold for touch recognition on the touch panel 252 (touch recognition threshold) to a second designated value. For example, if the object is of the second type (e.g. finger), the electronic device 201 may set the touch recognition threshold to a value of Ø6 mm to sense contact of a finger of the user.

In an embodiment of the present disclosure, when the object is of the second type, the electronic device 201 may set the touch recognition threshold to one of multiple second designated values according to at least one of the touch area and the touch pressure. For example, when the touch area of a second-type object is between 5 and 6 touch cells, the electronic device 201 may set the touch recognition threshold to a value of Ø5 mm. When the touch area of a second-type object is between 7 and 8 touch cells, the electronic device 201 may set the touch recognition threshold to a value of Ø6 mm. As another example, when the touch pressure caused by a second-type object is between 1 and 2 units of pressure, the electronic device 201 may set the touch recognition threshold to a value of Ø5 mm. When the touch pressure caused by a second-type object is between 3 and 4 units of pressure, the electronic device 201 may set the touch recognition threshold to a value of Ø6 mm.

At step 407, the electronic device 201 (e.g. processor 210) recognizes touch input by the object on the basis of the touch recognition threshold set to one of the first designated value and the second designated value. The electronic device 201 may recognize touch input when the object brought in contact with the touch panel 252 causes a capacitance change greater than or corresponding to the touch recognition threshold set to one of the first designated value and the second designated value. When the touch recognition threshold is high, it may be difficult for the electronic device 201 to recognize touch input by an object causing a capacitance change. For example, when the threshold is set to a second designated value (Ø6 mm) (corresponding to a level for recognizing a finger touch), the electronic device 201 may ignore a pen touch causing a capacitance change corresponding to Ø2.5 mm. In an embodiment of the present disclosure, when touch input is not recognized for a given time after changing the touch recognition threshold, the electronic device 201 may reset the touch recognition threshold to the default value or the previous value before change. For example, assume that the touch recognition threshold is set to an initial value of Ø2.5 mm. When an object contacting the touch panel 252 is of the second type, the electronic device 201 may set the touch recognition threshold to a value of Ø6 mm. Thereafter, when touch input is not recognized for a given time (e.g. 2 seconds), the electronic device 201 may reset the touch recognition threshold to the previous value of Ø2.5 mm.

Figure 6:
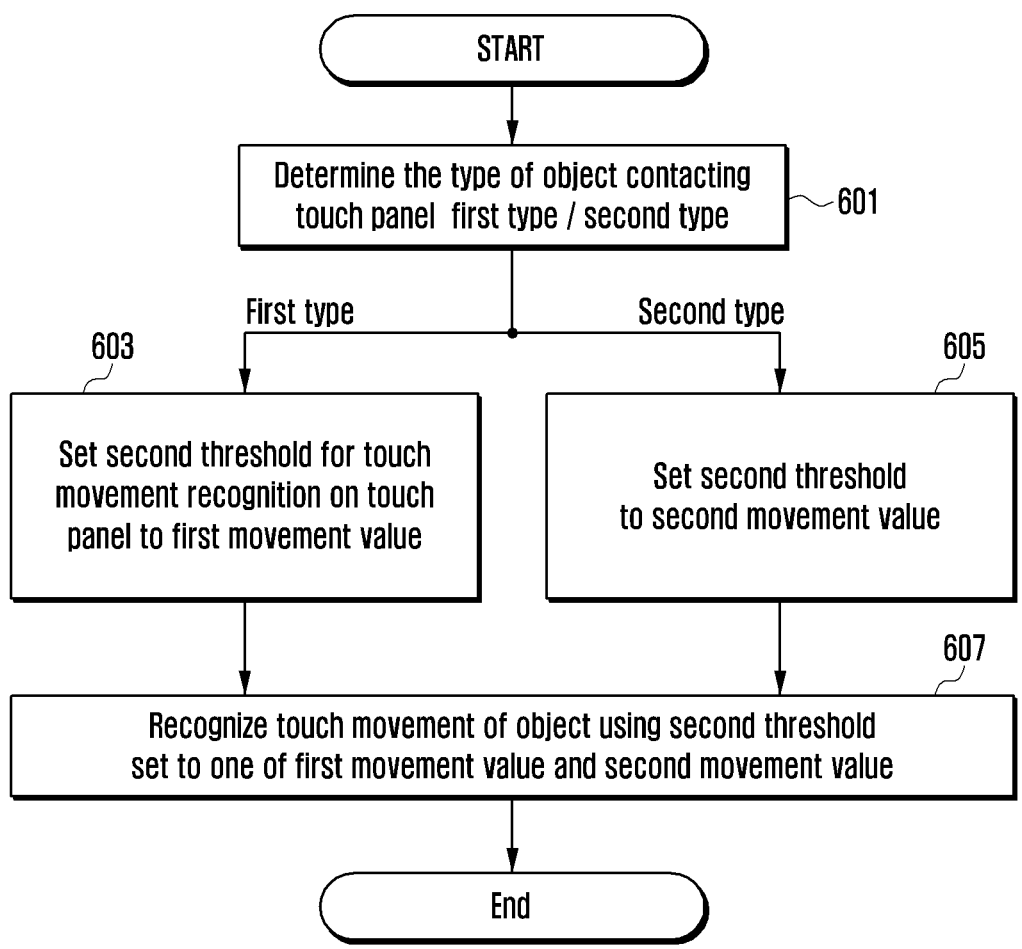
FIG. 6 is a flowchart of a procedure for an electronic device to recognize touch movement caused by an object according to an embodiment of the present disclosure.

FIG. 6 is a flowchart of a procedure for the electronic device to recognize touch movement caused by an object according to an embodiment of the present disclosure.

At step 601, the electronic device 201 (e.g. processor 210) determines the type of a touch object contacting the touch panel 252. Object type determination at step 601 is identical to step 401 of FIG. 4.

If the object is of the first type, at step 603, the electronic device 201 (e.g. processor 210) sets the threshold for touch movement recognition on the touch panel 252 (touch movement recognition threshold) to a first movement value. For example, if the object is of the first type (e.g. stylus pen), the electronic device 201 may set the touch movement recognition threshold to a movement value of 1 mm to sense contact and movement of the stylus pen. This threshold may indicate movement of the object by a given distance or more from the touch area thereof for touch movement recognition.

In an embodiment of the present disclosure, when the object is of the first type, the electronic device 201 may set the touch movement recognition threshold to one of multiple first movement values according to at least one of the touch area and the touch pressure. For example, when the touch area of a first-type object is between 1 and 2 touch cells, the electronic device 201 may set the touch movement recognition threshold to a movement value of 1 mm. When the touch area of a first-type object is between 3 and 4 touch cells, the electronic device 201 may set the touch movement recognition threshold to a movement value of 1.5 mm. As another example, when the touch pressure caused by a first-type object is between 5 and 6 units of pressure, the electronic device 201 may set the touch movement recognition threshold to a movement value of 1 mm. When the touch pressure caused by a first-type object is between 7 and 8 units of pressure, the electronic device 201 may set the touch movement recognition threshold to a movement value of 1.5 mm.

If the object is of the second type, at step 605, the electronic device 201 (e.g. processor 210) sets the threshold for touch movement recognition on the touch panel 252 (touch movement recognition threshold) to a second movement value. For example, if the object is of the second type (e.g. finger), the electronic device 201 may set the touch movement recognition threshold to a movement value of 2 mm to sense contact and movement of the finger.

In an embodiment of the present disclosure, when the object is of the second type, the electronic device 201 may set the touch movement recognition threshold to one of multiple second movement values according to at least one of the touch area and the touch pressure. For example, when the touch area of a second-type object is between 5 and 6 touch cells, the electronic device 201 may set the touch movement recognition threshold to a movement value of 2 mm. When the touch area of a second-type object is between 7 and 8 touch cells, the electronic device 201 may set the touch movement recognition threshold to a movement value of 2.5 mm. As another example, when the touch pressure caused by a second-type object is between 1 and 2 units of pressure, the electronic device 201 may set the touch movement recognition threshold to a movement value of 2 mm. When the touch pressure caused by a second-type object is between 3 and 4 units of pressure, the electronic device 201 may set the touch movement recognition threshold to a movement value of 2.5 mm.

At step 607, the electronic device 201 (e.g. processor 210) recognizes touch movement of the object on the basis of the touch movement recognition threshold set to one of the first movement value and the second movement value. The electronic device 201 may recognize touch movement when the object brought in contact with the touch panel 252 is moved by at least a distance corresponding to the touch movement recognition threshold set to one of the first movement value and the second movement value. The electronic device 201 may fail to recognize touch movement of an object moved by a distance less than the touch movement recognition threshold. For example, when the touch movement recognition threshold is set to a movement value of 2 mm for recognizing finger movement, the electronic device 201 may ignore touch movement of a finger moved by a distance less than 2 mm.

In an embodiment of the present disclosure, the electronic device 201 may set the scanning frequency of the touch panel 252 to a first value when the object is of the first type, and set the scanning frequency thereof to a second value when the object is of the second type. For example, the electronic device 201 may set the scanning frequency to 240 Hz when the object is of the first type (e.g. stylus pen), and set the scanning frequency thereof to 200 Hz when the object is of the second type (e.g. finger).

In an embodiment of the present disclosure, when the object is of the first type, the electronic device 201 may perform a first function in response to touch input by the object, and when the object is of the second type, the electronic device 201 may perform a second function in response to touch input by the object. For example, when the object is of the first type (e.g. stylus pen), the electronic device 201 may perform a writing function in response to touch input by the stylus pen. When the object is of the second type (e.g. finger), the electronic device 201 may perform an erasure function in response to touch input by the finger.

According to an embodiments of the present disclosure, a method of touch input recognition for an electronic device includes determining the type of an object contacting the touch panel, setting, when the object is of the first type, the threshold for touch recognition on the touch panel to a first designated value, setting, when the object is of the second type, the threshold to a second designated value, and recognizing touch input by the object on the basis of the threshold set to one of the first designated value and the second designated value.

In an embodiment of the present disclosure, determining the type of an object includes determining the type of the object contacting the touch panel on the basis of the touch pressure applied by the object.

In an embodiment of the present disclosure, the electronic device includes a pressure sensor to sense the touch pressure applied by the object. Determining the type of an object includes determining that the object is of the first type when the touch pressure sensed by the pressure sensor is greater than or equal to a threshold pressure, and determining that the object is of the second type when the touch pressure is lower than the threshold pressure.

In an embodiment of the present disclosure, the touch panel includes a fingerprint recognition sensor. Determining the type of an object includes obtaining a fingerprint related to the object using the fingerprint recognition sensor and determining the type of the object at least partially on the basis of the obtained fingerprint.

In an embodiment of the present disclosure, determining the type of an object includes determining the type of the object contacting the touch panel on the basis of the touch area of the object.

In an embodiment of the present disclosure, determining the type of an object includes determining that the object is of the first type when the touch area is less than a threshold area, and determining that the object is of the second type when the touch area is greater than or equal to the threshold area.

In embodiment of the present disclosure, setting the threshold for touch recognition to a first designated value includes setting, when the object is of the first type, the threshold to one of multiple first designated values according to at least one of the touch area and the touch pressure.

In an embodiment of the present disclosure, setting the threshold for touch recognition to a second designated value may include setting, when the object is of the second type, the threshold to one of multiple second designated values according to at least one of the touch area and the touch pressure.

In an embodiment of the present disclosure, the method of touch input recognition includes setting, when the object is of the first type, the second threshold for touch movement recognition on the touch panel to a first movement value, setting, when the object is of the second type, the second threshold to a second movement value, and recognizing touch movement of the object on the basis of the second threshold set to one of the first movement value and the second movement value.

In an embodiment of the present disclosure, the object of the first type may be a stylus pen, and the object of the second type may be a finger or thumb.

FIG. 7 illustrates an electronic device whose display module includes pressure sensors according to an embodiment of the present disclosure.

Referring to FIG. 7, the electronic device 201 includes a display module 260. The display module 260 includes a cover glass 710, a touch panel 720, at least one pressure sensor 730, and a display panel 740. The cover glass 710 is the top layer member of the display module 260 and protects the display module 260 from external shock and physical damage. The touch panel 720 corresponds to the touch panel 252 shown in FIG. 2 and may recognize touch input by an object. The pressure sensor 730 may measure the pressure applied by the object contacting the touch panel 720 and send information on the measured pressure to the processor 210. The pressure sensor 730 may be electrically connected to a control circuit controlling both the touch panel 720 and the pressure sensor 730 or may be electrically connected to a pressure sensor control circuit controlling the pressure sensor 730 only. The control circuit or the pressure sensor control circuit may be electrically connected to the processor 210 and may forward information on the pressure measured by the pressure sensor 730 to the processor 210. The display panel 740 corresponds to the panel 262 shown in FIG. 2 and may display various screens.

The term "module" as used in the present disclosure may refer to, for example, a unit including one or more combinations of hardware, software, and firmware. The term "module" may be used interchangeably with terms such as "unit," "logic," "logical block," "component," "circuit," and the like. The "module" may be a minimum unit of a component formed as one body or a part thereof. The "module" may be a minimum unit for performing one or more functions or a part thereof. The "module" may be implemented mechanically or electronically. For example, the "module", according to an embodiment of the present disclosure, may include at least one of an application-specific IC (ASIC) chip, a field-programmable gate array (FPGA), and a programmable-logic device for performing certain operations which have been known or are to be developed in the future.

Examples of computer-readable media include magnetic media, such as hard disks, floppy disks, and magnetic tape, optical media such as compact disc ROM (CD-ROM) and DVD, magneto-optical media, such as floptical disks, and hardware devices that are specially configured to store and perform program instructions (e.g., programming modules), such as ROM, RAM, flash memory, etc. Examples of program instructions include machine code instructions created by assembly languages, such as a compiler, and code instructions created by a high-level programming language executable in computers using an interpreter, etc. The described hardware devices may be configured to act as one or more software modules in order to perform the operations and methods described above, or vice versa.

Modules or programming modules according to an embodiment of the present disclosure may include one or more components, remove part of them described above, or include new components. The operations performed by modules, programming modules, or the other components, according to the present disclosure, may be executed in serial, parallel, repetitive or heuristic fashion. Part of the operations may be executed in any other order, skipped, or executed with additional operations.

According to an embodiment of the present disclosure, an electronic device may include a touch panel and a processor. The processor may be configured to perform a process of determining the type of an object contacting the touch panel, setting, when the object is of the first type, the threshold for touch recognition on the touch panel to a first designated value, setting, when the object is of the second type, the threshold to a second designated value, and recognizing touch input by the object on the basis of the threshold set to one of the first designated value and the second designated value.

In an embodiment of the present disclosure, the processor may be configured to determine the type of the object contacting the touch panel on the basis of the touch pressure applied by the object.

In an embodiment of the present disclosure, the electronic device includes a pressure sensor to sense the touch pressure applied by an object. The processor may be configured to determine that the object is of the first type when the touch pressure sensed by the pressure sensor is greater than or equal to a threshold pressure, and to determine that the object is of the second type when the touch pressure is lower than the threshold pressure.

In an embodiment of the present disclosure, the touch panel includes a fingerprint recognition sensor. The processor may be configured to obtain a fingerprint related to the object using the fingerprint recognition sensor and to determine the type of the object at least partially on the basis of the obtained fingerprint.

In an embodiment of the present disclosure, the processor may be configured to determine the type of the object contacting the touch panel on the basis of the touch area of the object.

In an embodiment of the present disclosure, the processor may be configured to determine that the object is of the first type when the touch area is less than a threshold area, and to determine that the object is of the second type when the touch area is greater than or equal to the threshold area.

In an embodiment of the present disclosure, when the object is of the first type, the processor may be configured to set the threshold to one of multiple first designated values according to at least one of the touch area and the touch pressure.

In an embodiment of the present disclosure, when the object is of the second type, the processor may be configured to set the threshold to one of multiple second designated values according to at least one of the touch area and the touch pressure.

In an embodiment of the present disclosure, the processor may be configured to perform a process of setting, when the object is of the first type, the second threshold for touch movement recognition on the touch panel to a first movement value, setting, when the object is of the second type, the second threshold to a second movement value, and recognizing touch movement of the object on the basis of the second threshold set to one of the first movement value and the second movement value.

According to an embodiment of the present disclosure, the object of the first type may be a stylus pen, and the object of the second type may be a finger or thumb.

According to an embodiment of the present disclosure, a computer-readable storage medium may store a program that, when executed by a processor, causes a processor to determine the type of an object contacting a touch panel, setting, when the object is of the first type, the threshold for touch recognition on the touch panel to a first designated value, setting, when the object is of the second type, the threshold to a second designated value, and recognizing touch input by the object on the basis of the threshold set to one of the first designated value and the second designated value.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a touch panel; and
   a processor configured to:
   detect a touch input by an object on the touch panel,
   determine a type of the object contacting the touch panel,
   set, when the object is of a first type, a threshold for recognizing a movement of the object in contact with the touch panel as a movement of the touch input to a first movement value,
   set, when the object is of a second type, the threshold for recognizing a movement of the object in contact with the touch panel as a movement of the touch input to a second movement value, and
   determine, in response to detecting a movement of the object in contact with the touch panel, whether to recognize the movement of the object as a movement of the touch input based on the set threshold according to the type of the object,
   wherein the object of the first type is a stylus pen, and the object of the second type is a finger.

2. The electronic device of claim 1, wherein the processor is further configured to determine the type of the object contacting the touch panel on the basis of a touch pressure applied by the object.

3. The electronic device of claim 1, further comprising at least one pressure sensor to sense a touch pressure applied by an object, wherein the processor is further configured to determine that the object is of the first type when the touch pressure sensed by the pressure sensor is greater than or equal to a threshold pressure, and to determine that the object is of the second type when the touch pressure is lower than the threshold pressure.

4. The electronic device of claim 1, wherein the touch panel includes a fingerprint recognition sensor, and wherein the processor is further configured to obtain a fingerprint related to the object using the fingerprint recognition sensor and to determine the type of the object at least partially on the basis of the obtained fingerprint.

5. The electronic device of claim 1, wherein the processor is further configured to determine the type of the object contacting the touch panel on the basis of a touch area of the object contacting the touch panel.

6. The electronic device of claim 5, wherein the processor is further configured to determine that the object is of the first type when the touch area is less than a threshold area, and to determine that the object is of the second type when the touch area is greater than or equal to the threshold area.

7. The electronic device of claim 1, wherein, when the object is of the first type, the processor is further configured to set the threshold to one of multiple first movement values according to at least one of a touch area and a touch pressure.

8. The electronic device of claim 1, wherein, when the object is of the second type, the processor is further configured to set the threshold to one of multiple second movement values according to at least one of a touch area and a touch pressure.

9. A method of touch input recognition for an electronic device, the method comprising:
   detecting a touch input by an object on a touch panel;
   determining a type of the object contacting the touch panel;
   setting, when the object is of a first type, a threshold for recognizing a movement of the object in contact with the touch panel as a movement of the touch input on the touch panel to a first movement value;
   setting, when the object is of a second type, the threshold for recognizing a movement of the object in contact with the touch panel as a movement of the touch input to a second movement value; and
   determining, in response to detecting a movement of the object in contact with the touch panel, whether to recognize the movement of the object as a movement of the touch input based on the set threshold according to the type of the object,
   wherein the object of the first type is a stylus pen, and the object of the second type is a finger.

10. The method of claim 9, wherein determining the type of the object contacting the touch panel is based on a touch pressure applied by the object.

11. The method of claim 10, wherein the electronic device comprises at least one pressure sensor to sense the touch pressure applied by the object, and wherein determining the type of an object comprises determining that the object is of the first type when the touch pressure sensed by the pressure sensor is greater than or equal to a threshold pressure, and determining that the object is of the second type when the touch pressure is lower than the threshold pressure.

12. The method of claim 9, wherein the touch panel includes a fingerprint recognition sensor, and wherein determining the type of an object comprises obtaining a fingerprint related to the object using the fingerprint recognition sensor and determining the type of the object at least partially on the basis of the obtained fingerprint.

13. The method of claim 9, wherein determining the type of the object contacting the touch panel is based on a touch area of the object.

14. The method of claim 13, wherein determining the type of the object comprises:
   determining that the object is of the first type when the touch area is less than a threshold area; and
   determining that the object is of the second type when the touch area is greater than or equal to the threshold area.

15. The method of claim 9, wherein setting a threshold to a first designated value comprises setting, when the object is of the first type, the threshold to one of multiple first movement values according to at least one of a touch area or a touch pressure.

16. The method of claim 9, wherein setting the threshold to a second designated value comprises setting, when the object is of the second type, the threshold to one of multiple second movement values according to at least one of a touch area and a touch pressure.

\* \* \* \* \*